US008611525B2

(12) United States Patent
Cai

(10) Patent No.: US 8,611,525 B2
(45) Date of Patent: Dec. 17, 2013

(54) SYSTEM AND METHOD TO CANCEL A BLINDLY-TRANSFERRED CALL

(75) Inventor: Yuan Cai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1736 days.

(21) Appl. No.: 11/671,296

(22) Filed: Feb. 5, 2007

(65) Prior Publication Data

US 2008/0187127 A1 Aug. 7, 2008

(51) Int. Cl.
H04M 3/00 (2006.01)

(52) U.S. Cl.
USPC ................................. 379/265.11; 379/266.01

(58) Field of Classification Search
USPC ............. 379/265.11, 265.02, 265.01, 266.01, 379/266.04, 309; 370/352
See application file for complete search history.

(56) References Cited

U.S. PATENT DOCUMENTS

| 6,650,748 | B1* | 11/2003 | Edwards et al. ......... 379/266.04 |
| 6,847,713 | B1* | 1/2005 | Cutting et al. ........... 379/265.11 |
| 7,006,614 | B2 | 2/2006 | Feinberg et al. ............... 379/164 |
| 7,103,166 | B2 | 9/2006 | Crockett et al. ......... 379/211.02 |
| 7,155,225 | B2 | 12/2006 | Segal et al. .................... 455/436 |
| 2004/0190704 | A1 | 9/2004 | Crockett et al. ......... 379/211.02 |
| 2005/0021872 | A1* | 1/2005 | Poustchi et al. .............. 709/250 |
| 2005/0047435 | A1 | 3/2005 | Segal et al. .................... 370/466 |
| 2005/0141691 | A1 | 6/2005 | Wengrovitz ............. 379/211.02 |
| 2006/0142010 | A1* | 6/2006 | Tom et al. ..................... 455/445 |
| 2006/0159251 | A1* | 7/2006 | Guillard et al. .......... 379/212.01 |
| 2006/0221941 | A1* | 10/2006 | Kishinsky et al. ............. 370/352 |
| 2007/0041527 | A1* | 2/2007 | Tuchman et al. .......... 379/88.22 |

OTHER PUBLICATIONS

Sparks, "SIP Call Control—Transfer," Network Working Group, pp. 1-14/1-17, Jul. 18, 2001.
Sparks, "The Session Initiation Protocol (SIP) Refer Method," Network Working Group, pp. 22/23, Apr. 2003.

* cited by examiner

Primary Examiner — Antim Shah
(74) Attorney, Agent, or Firm — Baker Botts L.L.P.

(57) ABSTRACT

A system and method to cancel a blindly-transferred call in Session Initiation Protocol (SIP) includes receiving a call request from an endpoint and selecting a first call agent to handle the call request. A blind transfer of the call request is initiated to the first call agent. It is determined whether the first call agent is available to handle the call request. If the first call agent is not available to handle the call request, the blind transfer of the call request is canceled.

10 Claims, 2 Drawing Sheets

SYSTEM AND METHOD TO CANCEL A BLINDLY-TRANSFERRED CALL

TECHNICAL FIELD

This invention relates generally to communication services, and more specifically, to a system and method to cancel a blindly-transferred call.

BACKGROUND

A Private Branch exchange (PBX) and a call center may work together in an environment. The call center may blindly transfer a call to a call agent of the PBX. If the call agent is unavailable or busy, however, the call center continues to attempt to transfer the call to the busy call agent.

SUMMARY OF THE DISCLOSURE

In accordance with the present invention, disadvantages and problems associated with previous techniques to cancel a blindly-transferred call may be reduced or eliminated.

According to one embodiment of the present invention, a system and method to cancel a blindly-transferred call in Session Initiation Protocol (SIP) includes receiving a call request from an endpoint and selecting a first call agent to handle the call request. A blind transfer of the call request is initiated to the first call agent. It is determined whether the first call agent is available to handle the call request. If the first call agent is not available to handle the call request, the blind transfer of the call request is canceled.

Certain embodiments of the invention may provide one or more technical advantages. A technical advantage of one embodiment may be that a call center may take over a blindly-transferred call if an attempted call agent is not available. The call center may then attempt a blind transfer to another call agent.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
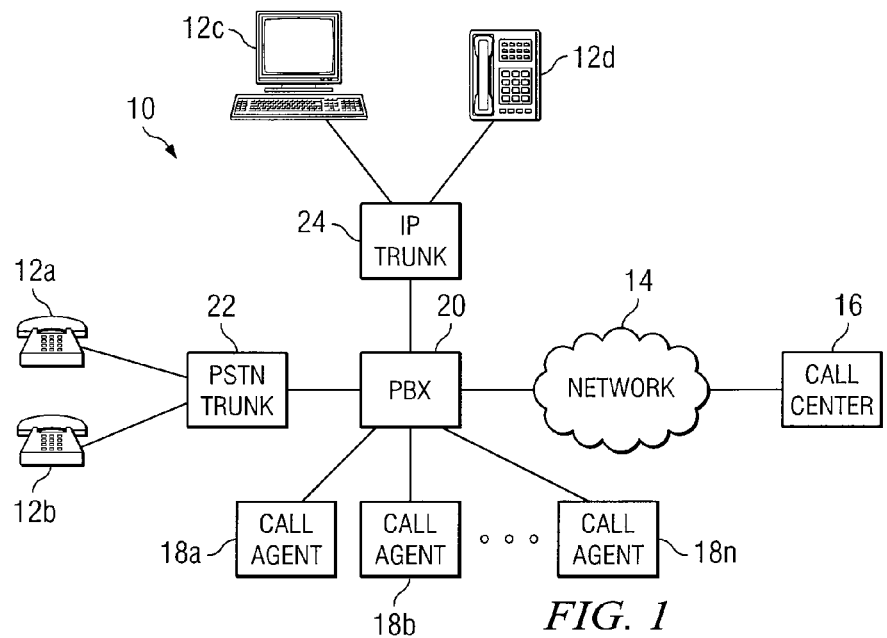
FIG. 1 is a block diagram of one embodiment of a system to cancel a blindly-transferred call.
Figure 3:
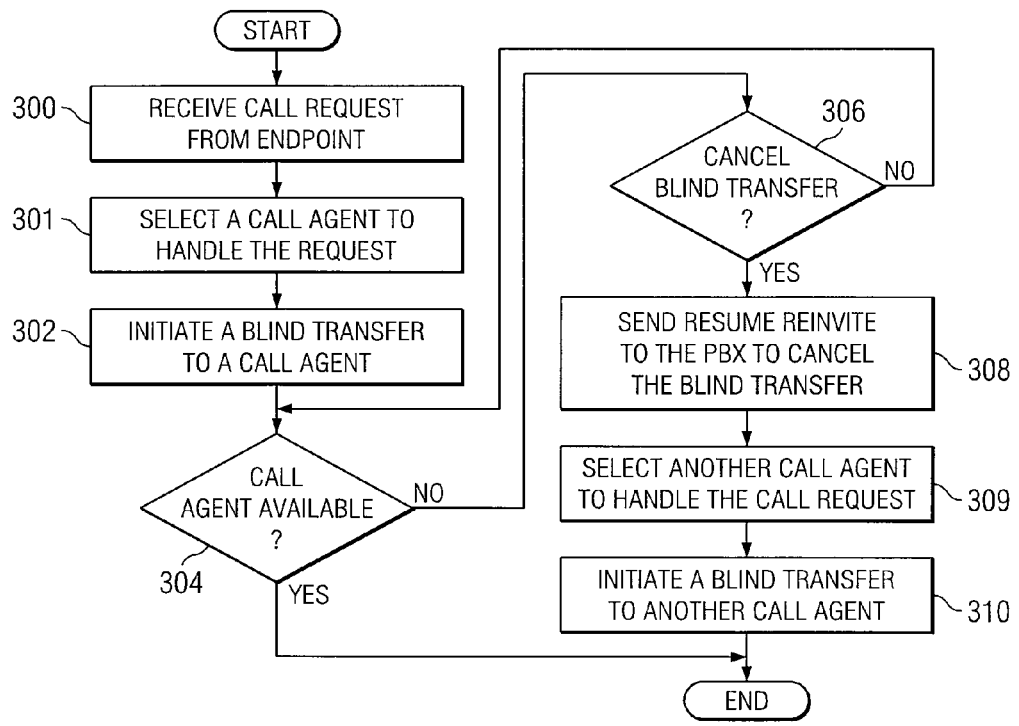
FIG. 3 is a flowchart illustrating one embodiment of a method to cancel a blindly-transferred call.
Figure 2:
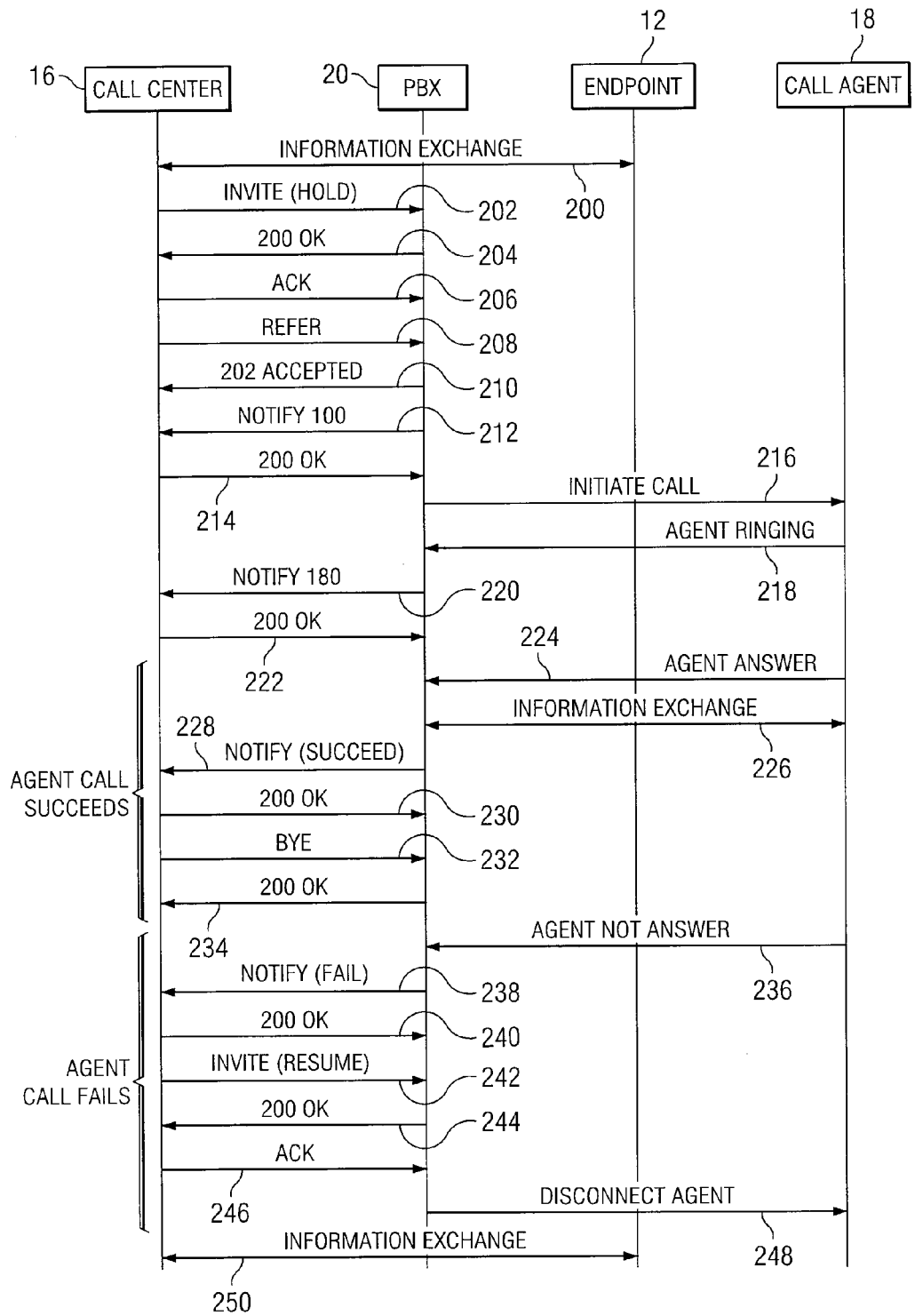
FIG. 2 is a call-flow diagram illustrating examples of a successful blind transfer and a canceled blind transfer.

Embodiments of the present invention and its advantages are best understood by referring to FIGS. 1 through 3 of the drawings, like numerals being used for like and corresponding parts of the various drawings.

FIG. 1 is a block diagram of one embodiment of a system 10 to cancel a blindly-transferred call. System 10 includes endpoints 12 that communicate with a call center 16 over a network 14. Call center 16 may transfer calls from endpoints 12 to call agents 18 using any suitable technique, such as a blind transfer. According to an embodiment, call center 16 may cancel the blind transfer if a call agent 18 is not available.

System 10 includes any suitable number of endpoints 12 that communicate with other components in system 10. In one embodiment, endpoints 12 communicate over network 14 to call center 16. Endpoints 12 communicate with call center 16 for any suitable reason, such as to contact a customer service representative or a technical support representative. Endpoints 12 may communicate information such as data, audio, video, multimedia, any other suitable type of information, or any combination of the preceding. For example, endpoints 12 may participate in packet-based communication where voice information is communicated through packets. The communication may be in the form of a call, a message, or any other suitable form of communication.

Endpoints 12 may comprise, for example, a wireless or cellular telephone, an Internet Protocol (IP) telephone, a mobile handset, a computer supporting a telephony application, a Personal Digital Assistant (PDA), or any other endpoint suitable for communicating in system 10. For example, endpoints 12a and 12b represent devices operable to communicate with call center 16 using Public Switched Telephone Network (PSTN) trunk 22. PSTN trunk 22 represents a channel that facilitates communication between call center 16 and endpoints 12 that are operable in a circuit-switched telephone network. Endpoints 12a and 12b may represent a plain old telephone service (POTS) or a mobile phone. As another example, endpoints 12c and 12d represent devices operable to communicate with call center 16 using IP trunk 24. IP trunk 24 represents a channel that facilitates communication between call center 16 and IP phones, computers supporting telephony applications, or any other suitable communication device.

Endpoints 12 include hardware, software, or any suitable combination of the preceding to facilitate communication. Endpoints 12 may support, for example, IP, mobile IP, Session Initiation Protocol (SIP), Skinny Client Control Protocol (SCCP), H.323, or other suitable device or call control communication protocols, or any suitable combination of the preceding.

Network 14 represents a packet-based network that allows components of system 10 to communicate with other networks, endpoints 12, or other components of system 10. Network 14 provides support for any suitable packet-based protocol, such as IP version 4 or IP version 6. Network 14 may include at least a portion of one or more of the following: a metropolitan area network (MAN), a local area network (LAN), a wide area network (WAN), any other public or private data network, a local, regional, or global communication network, such as the Internet, an enterprise intranet, other suitable wireline or wireless communication link, or any suitable combination of the preceding. Network 14 may include any combination of gateways, routers, hubs, switches, access points, base stations, and/or any other hardware and/or software that may implement any suitable protocol. For example, network 14 supports any suitable call control protocol, such as SIP, H.323, any other suitable communication protocol, or any suitable combination of the preceding.

Call center 16 represents a centralized office that facilitates a large volume of communications with endpoints 12. For example, call center 16 handles telephone calls for a telemarketing company, a debt collection company, a customer support department of a company, or any other suitable function for any other suitable entity. Call center 16 may handle incoming calls, outgoing calls, or a combination of the preceding. For example, call center 16 may operate in a blended mode that handles outgoing and incoming calls simultaneously, a scheduled mode that handles incoming and outgoing calls separately for a period of time, and/or a single mode that only handles outgoing or incoming calls.

Call center 16 handles the administrative capabilities of call agents 18. Call agents 18 represent any suitable communication device operable to facilitate communications on behalf of call center 16 with users of endpoints 12. Call center 16 may include a database that stores information about each call agent 18. When call center 16 receives a call request, call center 16 identifies an available call agent 18 to handle the call according to the information in the database. Call center 16 then transfers the call to the identified call agent 18 using any suitable transfer technique, such as a blind transfer.

PBX 20 represents a private telephone switching system that services a particular entity, such as an enterprise. PBX 20 is coupled to call agents 18 and provides service to each call agent 18 and is coupled to PSTN trunk 22 and IP trunk 24 and facilitates communication between endpoints 12 and call agents 18. PBX 20 acts as an intermediary between call center 16 and endpoints 12 and between call center 16 and call agents 18. For example, PBX 20 facilitates communication by routing transferred calls from call center 16 to call agent 18. PBX 20 supports any suitable device or call control protocol, such as SIP, any other suitable communication protocol, or any suitable combination of the preceding.

In an example of an embodiment of operation, endpoint 12 sends a call request to call center 16. Call center 16 determines to which call agent 18 the call request should be routed. For example, call center 16 determines to transfer the call request to call agent 18a. Call center 16 blindly transfers the call request to call agent 18a. Call center 16 transmits a message to endpoint 12 that includes the address of call agent 18, and endpoint 12 attempts to contact call agent 18 using the address. Call center 16 is not involved in the call signaling once the blind transfer is initiated.

In the illustrated embodiment, call agent 18a is busy or unavailable and cannot handle the call request. The transfer to call agent 18a fails, so call center 16 cancels the blind transfer by sending a message to endpoint 12 that reestablishes the involvement of call center 16 in call signaling. For example, call center 16 sends a resume reinvite message to the transferred endpoint 12 to reestablish involvement in call signaling. In an embodiment, the resume reinvite may be a SIP INVITE message. Although the example illustrates canceling a blind transfer in response to agent unavailability, call center 16 may cancel the blind transfer for any suitable number of other reasons, such as a ringing timeout occurring between endpoint 12 and call agent 18. Call center 16 may then attempt to transfer the call request to another call agent 18.

Modifications, additions, or omissions may be made to system 10 without departing from the scope of the invention. For example, endpoints 12 may be directly coupled to PBX 20. As another example, endpoints 12 may be directly coupled to another PBX 20. That PBX 20 manages call requests on behalf of endpoints 12 and may communicate with call center 16 to connect a call between an endpoint 12 and call agent 18. The connection between these two PBXs may be PSTN trunk 22 or IP trunk 24. Moreover, the operations of system 10 may be performed by more, fewer, or other components. Any suitable logic comprising software, hardware, other logic embodied in a computer readable medium, or any suitable combination of the preceding may perform the functions of system 10.

FIG. 2 is a call-flow diagram illustrating examples of a successful blind transfer and a canceled blind transfer. Messages 224 to 234 illustrate the successful blind transfer to call agent 18, and messages 236 to 248 illustrate the canceled blind transfer to call agent 18.

Endpoint 12 transmits a call request to PBX 20, which determines that the call request is addressed to call center 16. Call center 16 accepts the call request, and call center 16 and endpoint 12 participate in an information exchange at 200. Call center 16 determines to which call agent 18 to route the call request and facilitates a blind transfer to call agent 18 in messages 202 to 214. Call center 16 transmits an INVITE to PBX 20 at message 202 that places PBX 20 on hold in order to facilitate the blind transfer process. PBX 20 responds with a 200 OK in message 204, and call center 16 acknowledges the response in message 206.

Call center 16 initiates the blind transfer by transmitting a REFER to PBX 20 at message 208. The REFER message includes an address of call agent 18 to which call center 16 is transferring the call. PBX 20 responds with a 202 ACCEPTED at message 210 and a NOTIFY 100 at message 212 to inform call center 16 that the REFER message is being processed. Call center 16 transmits a 200 OK to PBX 20, and PBX 20 initiates a call to call agent 18 at 216 to complete the blind transfer.

Call agent 18 may be ringing at message 218. PBX 20 notifies call center 16 at message 220. Call center 16 responds with 200 OK at message 222.

If call agent 18 answers at message 224, the blind transfer to call agent 18 is successful. An information exchange proceeds at 226. PBX 20 informs call center 16 of the successful blind transfer in message 228, and call center 16 responds to the notification in message 230. Call center 16 transmits a BYE message to PBX 20 at message 232. PBX 20 transmits a 200 OK to call center 16 at message 234 to respond to the BYE message.

Messages 236 through 248 illustrate a canceled blind transfer. If PBX 20 is unable to transfer the call request to call agent 18 and call agent 18 does not answer at message 236, PBX 20 informs call center 16 of the failure in message 238. Call center 16 transmits a 200 OK in message 240 to respond to the notification. Call center 16 cancels the blind transfer by transmitting a resume reinvite to reestablish the media path to endpoint 12. For example, call center 16 transmits an INVITE to PBX 20 in message 242 to reestablish the media path with endpoint 12. In the illustrated embodiment, the INVITE message operates as the resume reinvite to cancel the blind transfer. PBX 20 responds with a 200 OK in message 244, and call center 16 acknowledges the response in message 246. PBX 20 disconnects call agent 18 at message 248.

The information exchange between call center 16 and endpoint 12 may continue at 250 until call center 16 determines another call agent 18 to handle the call request and initiates another blind transfer.

Modifications, additions, or omissions may be made to the call-flow diagram. For example, PBX 20 may relay the hold message 202 to endpoint 12 after receiving a hold message from call center 16 if endpoint 12 supports SIP. As another example, PBX 20 may be configured to wait any suitable period of time before notifying call center 16 of the transfer failure. The order of messages may vary according to the network type, configuration, and protocols. Although described in a particular sequence, messages in the call-flow diagram may occur serially or in parallel in any suitable order.

FIG. 3 is a flowchart illustrating one embodiment of a method to cancel a blindly-transferred call. Call center 16 receives a call request from endpoint 12 at step 300. Call center 16 selects a call agent 18 to handle the call request at step 301. Call center 16 initiates a blind transfer of the call request to the call agent 18 at step 302. Call center 16 may blindly transfer the call using any suitable technique. For example, in SIP, call center 16 transmits a REFER message to PBX 20, which transfers the call requests between call agents 18.

At step 304, call agent 18 may or may not be available. If call agent 18 is available at step 304, the method to cancel the blindly-transferred call ends, and an information exchange may occur between endpoint 12 and call agent 18.

If call agent 18 is not available at step 304, the method proceeds to step 306 to determine whether to cancel the blind transfer. If call center 16 determines not to cancel the blind transfer, the availability of call agent 18 may be monitored from step 304.

If call center 16 determines to cancel the blind transfer in step 306, call center 16 sends a resume reinvite to PBX 20 to cancel the blind transfer at step 308. For example, in SIP, call center 16 may transmit an INVITE message to PBX 20 to cancel the blind transfer. The INVITE message includes appropriate information to inform endpoint 12 that the blind transfer to call agent 18 is canceled and to reestablish the involvement of call center 16 in the call signaling. Call center 16 selects another call agent 18 to handle the call request at step 309. At step 310, call center 16 initiates a blind transfer to another call agent 18. The method then ends.

Modifications, additions, or omissions may be made to the flowchart. For example, call center 16 may place endpoint 12 on hold before executing the blind transfer. Call center 16 may use the hold when communicating with a SIP endpoint 12. As another example, call center 16 may receive a notification that call agent 18 is unavailable before determining whether to cancel the blind transfer. Although described in a particular sequence, the flowchart may perform steps serially or in parallel in any suitable order.

Certain embodiments of the invention may provide one or more technical advantages. A technical advantage of one embodiment may be that a call center may take over a blindly-transferred call if an attempted call agent is not available. The call center may then attempt a blind transfer to another call agent.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method to cancel a blindly-transferred call in Session Initiation Protocol (SIP), comprising:
   receiving, at a call center, a call request from an endpoint over a media path between the call center and the endpoint;
   closing the media path between the call center and the endpoint by communicating a hold message from the call center to a SIP enabled Private Branch eXchange (PBX);
   initiating a first blind transfer of the call request from the call center to a first call agent by communicating a SIP refer message to the SIP enabled PBX;
   determining that the first call agent is unavailable to handle the call request;
   canceling, by a processor, the first blind transfer of the call request initiated by the SIP refer message by transmitting a resume reInvite message from the call center to the SIP enabled PBX to re-establish the media path from the call center to the endpoint for the call request;
   initiating a second blind transfer of the call request from the call center to a second call agent by communicating the SIP refer message to the SIP enabled PBX;
   receiving notification from the SIP enabled PBX that the second blind transfer of the call request from the call center to the second call agent was successful; and
   communicating a SIP bye message from the call center to the SIP enabled PBX to disconnect the call center from the call request.

2. The method of claim 1, wherein the resume reInvite comprises a SIP INVITE message.

3. The method of claim 1, further comprising receiving a notification from the SIP enabled PBX informing a call center of availability of the first call agent.

4. A non-transitory computer readable medium comprising logic to cancel a blindly-transferred call in Session Initiation Protocol (SIP), the logic, when executed, operable to:
   receive, at a call center, a call request from an endpoint over a media path between the call center and the endpoint;
   close the media path between the call center and the endpoint by communicating a hold message from the call center to a SIP enabled Private Branch eXchange (PBX);
   initiate a first blind transfer of the call request from the call center to a first call agent by communicating a SIP refer message to the SIP enabled PBX;
   determine that the first call agent is unavailable to handle the call request;
   cancel the first blind transfer of the call request initiated by the SIP refer message by transmitting a resume reInvite message from the call center to the SIP enabled PBX to re-establish a media path from the call center to the endpoint for the call request;
   initiate a second blind transfer of the call request from the call center to a second call agent by communicating the SIP refer message to the SIP enabled PBX;
   receive notification from the SIP enabled PBX that the second blind transfer of the call request from the call center to the second call agent was successful; and
   communicate a SIP bye message from the call center to the SIP enabled PBX to disconnect the call center from the call request.

5. The computer readable medium of claim 4, wherein the resume reInvite comprises a SIP INVITE message.

6. The computer readable medium of claim 4, further operable to receive a notification from the SIP enabled PBX informing a call center of availability of the first call agent.

7. A system to cancel a blindly-transferred call in Session Initiation Protocol (SIP), comprising:
   a plurality of endpoints operable to initiate a plurality of call requests;
   a plurality of call agents operable to handle the plurality of call requests; and
   a call center communicatively coupled to the plurality of endpoints and the plurality of call agents, the call center operable to:
      receive, at the call center, a call request from an endpoint over a media path between the call center and the endpoint;
      close the media path between the call center and the endpoint by communicating a hold message from the call center to a SIP enabled Private Branch eXchange (PBX);
      initiate a first blind transfer of the call request to a first call agent by communicating a SIP refer message to the SIP enabled PBX;
      determine that the first call agent is unavailable to handle the call request;

cancel, by a processor, the first blind transfer of the call request initiated by the SIP refer message by transmitting a resume reInvite message to the SIP enabled PBX to re-establish a media path to the endpoint for the call request;

initiate a second blind transfer of the call request from the call center to a second call agent by communicating the SIP refer message to the SIP enabled PBX;

receive notification from the SIP enabled PBX that the second blind transfer of the call request from the call center to the second call agent was successful; and communicate a SIP bye message from the call center to the SIP enabled PBX to disconnect the call center from the call request.

8. The system of claim 7, wherein the resume reInvite comprises a SIP INVITE message.

9. The system of claim 7, the call center further operable to receive a notification from the SIP enabled PBX informing the call center of availability of the first call agent.

10. A system to cancel a blindly-transferred call in Session Initiation Protocol (SIP), comprising:

means for receiving, at a call center, a call request from an endpoint over a media path between the call center and the endpoint;

means for closing the media path between the call center and the endpoint by communicating a hold message from the call center to a SIP enabled Private Branch eXchange (PBX);

means for initiating a first blind transfer of the call request from the call center to a first call agent by communicating a SIP refer message to the SIP enabled PBX;

means for determining that the first call agent is unavailable to handle the call request;

means for canceling the first blind transfer of the call request initiated by the SIP refer message by transmitting a resume reInvite message from the call center to the SIP enabled PBX to re-establishing a media path from the call center to the endpoint for the call request;

means for initiating a second blind transfer of the call request from the call center to a second call agent by communicating the SIP refer message to the SIP enabled PBX;

means for receiving notification from the SIP enabled PBX that the second blind transfer of the call request from the call center to the second call agent was successful; and means for communicating a SIP bye message from the call center to the SIP enabled PBX to disconnect the call center from the call request.

\* \* \* \* \*